United States Patent [19]
Jack

[11] Patent Number: 5,070,241
[45] Date of Patent: Dec. 3, 1991

[54] RESONANT FREQUENCY MODULATION DETECTOR

[75] Inventor: Michael D. Jack, Goleta, Calif.

[73] Assignee: Santa Barbara Research Center, Goleta, Calif.

[21] Appl. No.: 557,884

[22] Filed: Jul. 25, 1990

Related U.S. Application Data

[63] Continuation-in-part of Ser. No. 387,209, Jul. 31, 1989, Pat. No. 4,962,316.

[51] Int. Cl.$^5$ .......................................... H01L 39/00
[52] U.S. Cl. ............................ 250/336.2; 250/336.1; 250/370.01; 333/995; 505/848; 505/849; 505/866
[58] Field of Search .............. 250/336.2, 336.1, 370.01; 505/848, 849, 866; 333/995

[56] References Cited

PUBLICATIONS

Alworth et al., "Nuclear Radiation Detection Using a Superconducting Resonant Cavity", J. Appl. Phys. 42 (1) Jan. 1971, pp. 166–169.

Primary Examiner—Carolyn E. Fields
Attorney, Agent, or Firm—W. C. Schubert; W. K. Denson-Low

[57] ABSTRACT

A multilayered radiation detector device (50) including a resonant cavity structure wherein one cavity wall electrode includes a portion of a photovoltaic radiation detector (52). Specifically, a RFM detector has a superconducting transmission line electrode (54) electrically coupled to a high mobility semiconductor layer (58) of the photovoltaic detector. The superconductor transmission line electrode inductance forms, in combinations with a photodetector depletion region capacitance, a series resonant or a parallel resonant circuit. A radiation-induced change in the capacitance results in a change in the circuit resonant frequency and a corresponding variation in the amplitude of an on-resonance RF signal applied to the circuit. In another embodiment the resonant cavity structure includes a gap having a width that is modulated by an amount of absorbed radiation, the radiation-induced change in the distributed cavity capacitance resulting in a change in the cavity resonant frequency.

26 Claims, 6 Drawing Sheets

RESONANT FREQUENCY MODULATION DETECTOR

This patent application is a continuation-in-part of copending and commonly assigned U.S. patent application Ser. No. 07/387,209, filed July 31, 1989, now U.S. Pat No. 4,962,316, issued Oct. 9, 1990, entitled "Frequency Domain Integrating Resonant Superconducting Transmission Line Detector" by Michael D. Jack, the disclosure of which is incorporated herein in its entirety.

FIELD OF THE INVENTION

This invention relates generally to radiation detectors and, in particular, relates to a Resonant Frequency Modulation detector having a superconducting meander line electrode interposed between a ground plane electrode and a high conductance semiconductor layer of a photovoltaic detector.

BACKGROUND OF THE INVENTION

In commonly assigned U.S. patent application Ser. No. 07/387,209, filed Jul. 31, 1989, entitled "Frequency Domain Integrating Resonant Superconducting Transmission Line Detector" Michael D. Jack discloses a FIRST detector that is comprised of a folded superconducting transmission line coupled at an input port to a microwave source and coupled at an output port to a microwave power monitor. An optically induced change in an inductance of the transmission line shifts the transmission line phase velocity and resonant frequency. This shift in resonant frequency attenuates the propagating wave amplitude proportionally to the product of the Q and the frequency shift. In Ser. No. 07/387,209 the FIRST detector is disclosed as a three layer structure having a bottom ground plane electrode and a top, superconductive radiation absorbing transmission line electrode.

Commonly assigned U.S. patent application Ser. No. 07/557898, filed July 25, 1991, entitled "Superconducting Multilayer Architecture for Radiative Transient Discrimination" is a continuation-in-part of Ser. No. 07/387,209 and is also incorporated herein by reference in its entirety. In this continuation-in-part application Michael D. Jack discloses a radiation detector that includes a superconductive transmission line having an input port for coupling to a frequency signal and an output port for coupling to a sensor for detecting a variation in the frequency signal. A transmission line electrode is interposed between a first electrode and a second electrode each of which is coupled to RF ground. The transmission line electrode is responsive to incident radiation that is absorbed within an adjacent RF ground electrode for having induced therein a change in a resonant frequency of the transmission line. Each of the RF ground electrodes is separated from the superconducting transmission line electrode by a layer comprised of a dielectric material.

It is an object of this invention to provide further embodiments of a FIRST detector.

It is another object of the invention to provide a superconductive resonant transmission line detector that is integrated with a photovoltaic radiation detector and that is responsive to radiation absorbed by the photodetector for having induced therein a change in resonant frequency that results in a detectable change to an on-resonance RF probe signal.

SUMMARY OF THE INVENTION

The above set forth and other objects are realized by a multilayered FIRST detector device wherein one of the outer electrode layers is a portion of a photovoltaic radiation detector. Specifically, the detector has a superconducting transmission line electrode disposed substantially adjacent to a high mobility semiconductor r layer of a photovoltaic radiation detector. The superconducting transmission line inductance forms, in combination with a photodetector capacitance, a series resonant or a parallel resonant circuit. A radiation induced change in the capacitance results in a change in the circuit resonant frequency and a corresponding variation in the amplitude of an on-resonance RF signal applied to the circuit.

More specifically, a frequency domain radiation detector has a resonant cavity comprised of an electrode for defining a superconducting transmission line. The transmission line has an input port for coupling to a frequency signal and an output port for coupling to a sensor for detecting a variation in the frequency signal. The resonant cavity is electrically coupled to a photovoltaic radiation detector such that an inductive reactance associated with the superconducting transmission line forms a series resonant or a parallel resonant circuit in combination with a capacitive reactance associated with a depletion region of the photovoltaic radiation detector. As a result, the radiation detector is responsive to electromagnetic radiation that is absorbed within the photovoltaic radiation detector for inducing a change in a resonant frequency of the series resonant or parallel resonant circuit. The change in resonant frequency further results in a detectable change in an amplitude of an RF signal propagating through the circuit.

In a further embodiment of the invention a frequency domain radiation detector has a resonant cavity comprised of a first electrode that operates as a superconducting transmission line. The transmission line has an input port for coupling to a frequency signal and an output port for coupling to a sensor for detecting a variation in the frequency signal. The resonant cavity also includes a photovoltaic radiation detector and a second electrode. The transmission line electrode is interposed between the photovoltaic detector and the second electrode and is spaced apart from each by a gap having a width selected for allowing a flexure of the transmission line electrode due to an electrostatic force between photovoltaic detector and the transmission line electrode. As the photovoltaic radiation detector absorbs radiation the electrostatic force between the transmission line electrode and the photovoltaic device is changed from an initial value. This results in a change in the amount of flexure with a corresponding change in the resonant cavity distributed capacitance and resonant frequency.

In a further embodiment of the invention a first RF ground plane electrode is suspended by spacers and is interposed between the transmission line electrode and the photovoltaic detector. The transmission line electrode is disposed upon a dielectric layer which in turn is disposed over a second superconducting RF ground plane electrode. For this embodiment the first RF ground electrode experiences a flexure which varies the resonant cavity distributed capacitance, resulting in a change in the cavity resonant frequency and a detectable change in an RF signal propagating through the transmission line electrode.

BRIEF DESCRIPTION OF THE DRAWING

The above set forth and other features of the invention are made more apparent in the ensuing Detailed Description of the Invention when read in conjunction with the attached Drawing, wherein:

FIG. 5b is a cross-sectional view taken along the section line b—b of FIG. 5a;

DETAILED DESCRIPTION OF THE INVENTION

Figure 1:
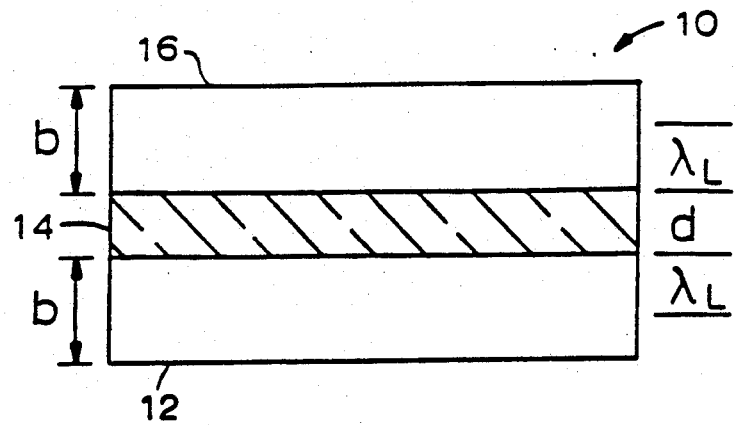
FIG. 1 is a cross-sectional view, not to scale, of a FIRST detector having a ground plane electrode, a dielectric layer and a superconducting transmission line electrode in accordance with the disclosure of commonly assigned U.S. patent application Ser. No. 07/387,209.

Reference is made first to FIG. 1 where there is illustrated a cross-sectional view of a superconducting transmission line 10 of the type disclosed in commonly assigned U.S. patent application Ser. No. 07/387,209, filed July 31, 1989, entitled "Frequency Domain Integrating Resonant Superconducting Transmission Line Detector" by Michael D. Jack.

The transmission line 10 is comprised of a RF ground electrode, or plane, 12 having a magnetic penetration depth $\lambda_L$ and a thickness b, a dielectric layer 14 of thickness d, and a top superconducting electrode 16 having a magnetic penetration depth $\lambda_L$ and a thickness b. Electromagnetic waves propagate along the transmission line with a velocity given by:

$$V_{ph} = (\mu_o \epsilon)^{-\frac{1}{2}} \left[ 1 + 2 \frac{\lambda_L}{d} \coth \frac{b}{\lambda_L} \right]^{-\frac{1}{2}}. \qquad (1)$$

For reasonable values of $b \approx \lambda_L$, $d \approx 0.2\lambda_L$, $\lambda_L = 1400$ Angstroms, and the dielectric constant $\epsilon$ approximately nine times that of free space; the group velocity Vg and phase velocity Vph can be shown to be approximately $3 \times 10^9$ cm/sec.

The superconducting electrode 16 is preferably fabricated as a well-coupled high current density polycrystalline or nominally single crystalline film layer. Materials suitable for the fabrication of the electrode 16 include conventional "low temperature" superconductors such as Pb, Nb, NbN, the superconducting compounds having the A15 crystal structure, $Nb_3(M)$ where M is Sn, Al or Ge, as well as high temperature superconductors including compounds based on compositions containing (Y, Ba, Cu, O), (Bi, Sr, Ca, Cu, O), (Tl, Va, Ca, Cu, O) and elemental replacements or substitutions thereof. An appropriate thickness of the upper superconducting electrode 16 is tailored to optimize performance in the desired wavelength range from $10^{-3}$ to $10^{-6}$ centimeters. Appropriate dielectrics include amorphous polycrystalline or crystalline insulators such as silicon dioxide, silicon nitride, aluminum, magnesium, zirconium, rare-earth or niobium oxides or epitaxially grown layers comprised of compounds related to the underlying superconductors. The dielectrics may also be thinned single crystal substrates such as oxides of Mg, Al, Strontium Titanate, Lanthanum Gallate, or Lanthanum Aluminate on which high quality superconductors may be grown. Thicknesses of dielectrics are chosen with respect to desired resonant frequency, dielectric losses and transmission line geometry and may vary in the approximate range between $10^{-2}$ to $10^{-6}$ centimeters. Dielectric thicknesses are comparable to or smaller than the spacing between adjacent folds of the upper electrode 16 to reduce crosstalk. Typical widths of the electrode 16 are approximately 0.1 micron to approximately 1000 microns. Typical overall lengths may range from approximately 0.001 cm to approximately 100 cm. The resonant frequency of the electrode 16 may vary between approximately several hundred KHz to approximately 1000 GHz and is, as indicated in Equation (2) below, inversely proportional to the length of the electrode 16.

Such a superconducting transmission line, having the preferred topological configuration including two or more ports, is advantageously applied to the detection of infrared or visible radiation. It is noted that the use of the invention is not limited to only these wavelengths but can be employed to detect radiation having wavelengths from the centimeter range up to and including x-rays and gamma rays. That is, the detector of the invention permits operation within a spectral band of from one or more centimeters to one or more Angstroms. The specific wavelength detected is a function of the bandgap of the material. For example, materials having a bandgap of a few tenths of a millivolt such as thallium arsenic and zinc are adaptable to the detection of centimeter length electromagnetic waves. Also, the material bandgap can be "tuned" to a specific wavelength through the use of an induced energy bandgap resulting from the exploitation of the superconducting proximity effect. The use of the proximity effect is disclosed in commonly assigned copending U.S. patent application Ser. No. 07/377,698, filed July 10, 1989, entitled "Proximity Effect VLWIR Radiation Detector" by J. A. Wilson.

Figure 2:
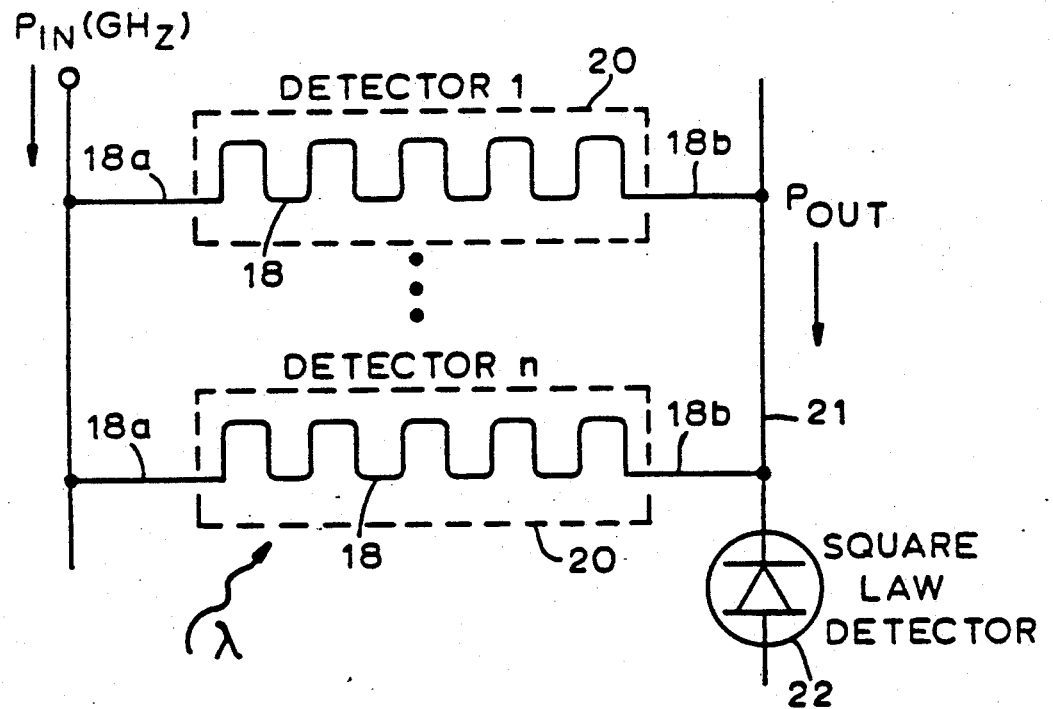
FIG. 2 is a representative top view, not to scale, showing radiation detectors each of which is comprised of a folded superconducting transmission line having an output coupled to a wideband non-resonant transmission line.

An example of one preferred topological configuration is shown in FIG. 2 where a transmission line electrode 18 can be seen to be folded between an input port 18a and an output port 18b. The folded transmission line electrode 18, also referred to as a "meander line", forms a portion of a radiation detector 20 that resonates at multiples of frequencies inversely proportional to the time for a wave to propagate from one end of the transmission line to the other and back:

$$f_N = NVph/2L. \tag{2}$$

An on-resonance probe pulse is simultaneously applied to the input ports 18a of the plurality of detectors 20 while the output ports 18b are sequentially coupled to an output transmission line 21 that is coupled to a detec- frequency through attentuation of the probe pulse power.

gain is provided by reading out the shift in resonant frequency through attenuation of the probe pulse power. A large change in $P_{OUT}$ is achieved due to the high Q of the resonant transmission line 18.

In the embodiment disclosed in commonly assigned U.S. patent application Ser. No. 07/387,209 radiation is absorbed within the electrode 16 of the FIRST detector 10, the electrode 16 being comprised of a superconducting film which may be less than 1000 Angstroms in thickness and which absorbs substantially all optical quanta within a spectral band of approximately 0.3 micron to approximately 30 microns or more. Cooper pair breaking by incident photons results in a change in the kinetic inductance and a consequent shift in the resonance frequency of the superconducting transmission line 18. For a high Q structure such as the transmission line 18 a small shift in resonance results in a large change in the amplitude of the propagated on-resonance probe pulse. Furthermore, a large probe pulse amplitude may be propagated along the superconducting transmission line 18 with minimal loss or power dissipation, thereby reducing the sensitivity requirements for the probe pulse detector(s) 22.

Upon optical irradiation of the FIRST detector superconducting paired electrons, or Cooper pairs, are broken thereby creating excess normal state quasiparticles. This reduction in electron pairs participating in the superconducting ground state reduces the critical current density that can screen magnetic fields thereby increasing the screening or magnetic penetration depth, $\lambda_L$. The penetration depth is proportional to the inverse square root of the number of electron pairs and can be expressed as:

$$\lambda_L = \lambda_{LO}(1-(n_{qp}/2n_s)), \tag{3}$$

where $n_{qp}$ is the quasiparticle density, $n_s$ is the electron pair density and $\lambda_{LO}$ is the magnetic penetration depth in the absence of light.

The number of broken electron pairs induced in the upper electrode 16 is proportional to the photon flux, yield per photon (r) and quasiparticle lifetime ($\tau$) and is inversely proportional to the thickness (b) as given by the expression $$n_{qp} = (r(Flux)\tau)/b. \tag{4}$$

Assuming a flux of $10^{11}/cm^2$, a per photon yield of six quasiparticles for each 10 micron photon, a lifetime of one millisecond and b=400 Angstroms a quasiparticle density of $1.5 \times 10^{14} cm^3$ is obtained.

Figure 7A:
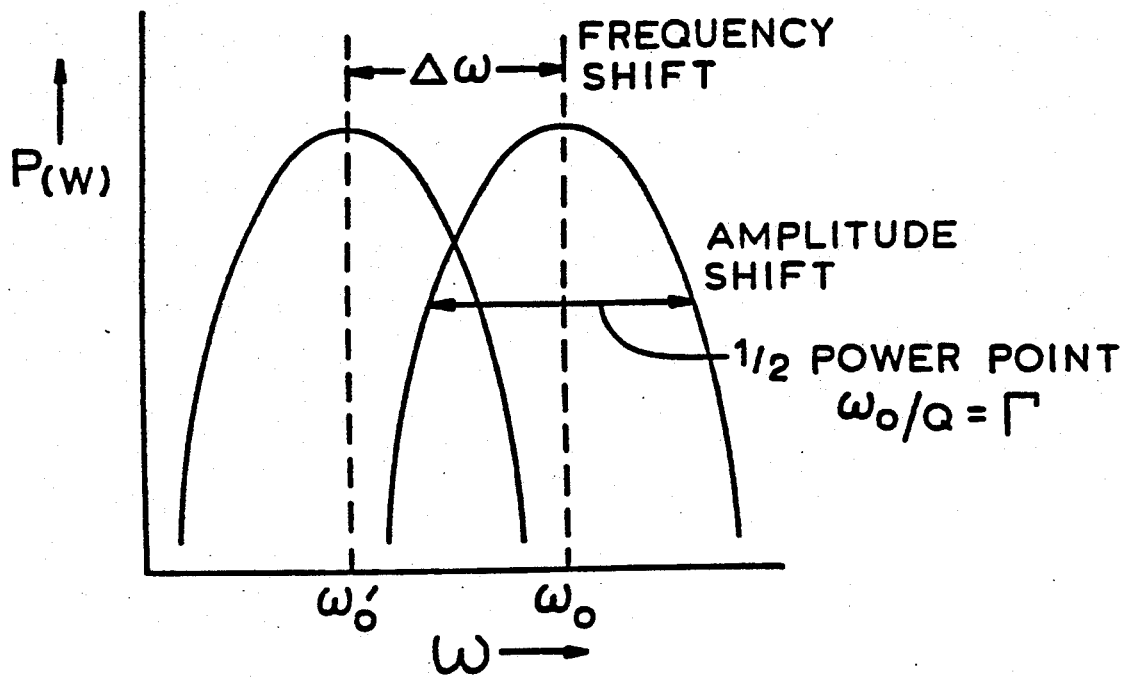
FIG. 7a is a graph that illustrates resonant transmission line characteristics, specifically a frequency and an amplitude shift as a function of illumination.

The steady state density of superconducting pairs is given approximately by $$n_s = N(o)E_g, \tag{5}$$

where N(o) is the single spin density of states and $E_g$ is the superconducting energy gap. For a density of states of $10^{20}$ and an energy gap of 16 meV there is obtained a change in penetration depth and, hence, resonant frequency of approximately 1 part in $10^4$ ($\Delta f/f = n_{qp}/n_s$). This change in resonant frequency due to illumination corresponds to a resonant frequency shift of approximately 0.4 MHz. As shown in FIG. 7a this change in resonant frequency also results in a corresponding attenuation of the narrow band microwave source which propagates through the resonant transmission line 18 by more than a factor of five. In FIG. 7a the term P($\omega$) is given by the expression $$P(\omega) \alpha 1/((\oplus - \oplus_o)^2 + (\oplus_o/2Q)^2). \tag{6}$$

Figure 7B:
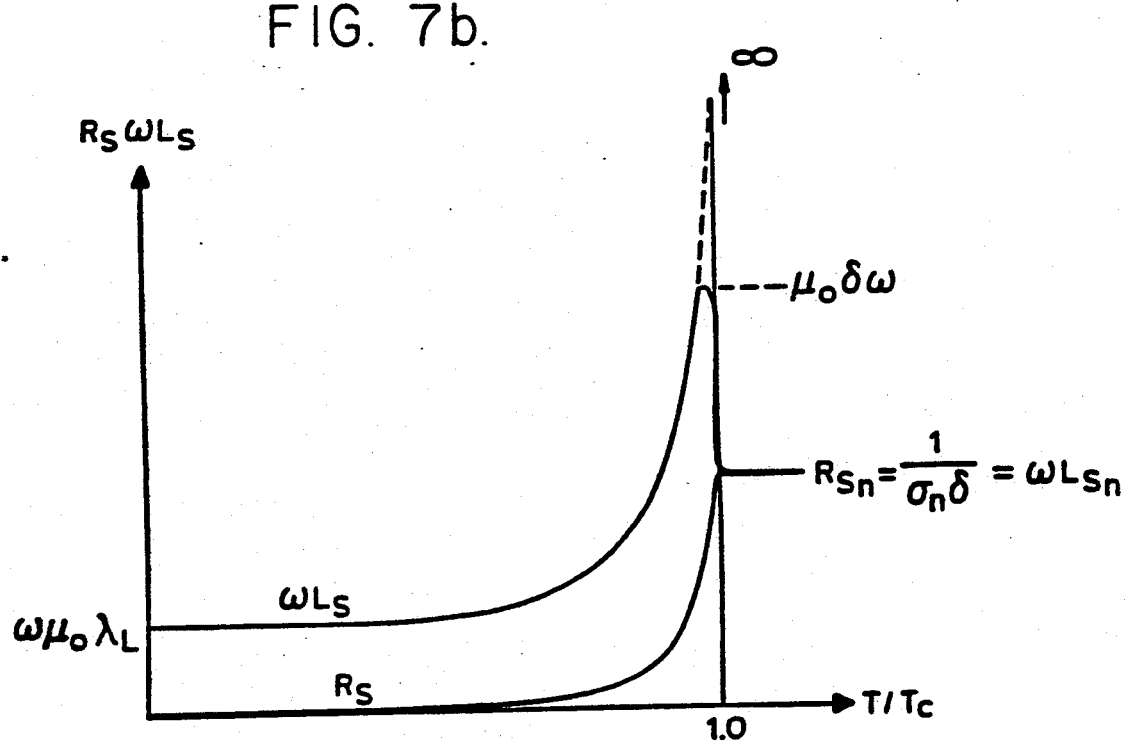
FIG. 7b is a graph which illustrates the temperature dependence of the resistive ($R_s$) and inductive ($\omega L_s$) components of the surface impedance of a superconductor.

The temperature dependence of the resistive ($R_s$) and inductive ($\omega L_s$) components of the surface impedance of a superconductor are shown in FIG. 7b. As can be seen convergence of the reactive component, or inductance, rapidly approaches an equilibrium value at approximately 70% of the critical temperature. Thus, operation of the FIRST detector is achieved at up to approximately 70% to approximately 80% of critical temperature. For 100K HTS material this beneficially corresponds to operation at liquid nitrogen temperature.

In the embodiments of FIGS. 1 and 2 each of the meander line electrodes 18a–18d is preferably fabricated as a narrow width linear element that overlies the low loss dielectric layer 14 and the bottom RF ground plane 12. As an example, a one micron width line, when folded such that it densely fills a 100 micron × 100 micron pixel area, provides an effective length of approximately 0.5 cm. Such a transmission line 18, assuming a typical dielectric constant value, resonates at multiples of approximately 4.0 GHz, a frequency that is compatible with commercially available, high performance microwave Schottky diode detectors. The narrow band transmission line 18 is coupled to the sensor 22 and to the narrow band microwave source by, for example, resistive or capacitive inputs that are integrated with the line 18. A sharp resonance characteristic having a Q value in excess of $10^5$ is achieved. A detector to detector uniformity of one part in $10^5$ is limited primarily by lithographic variations in the length of the folded transmission line electrode 18. In other embodiments the region within which the line is folded may have dimensions of approximately 10 microns by 10 microns to approximately 1000 microns by 1000 microns or greater. Of course the region need not be square in shape.

The transmission line electrodes 18 are coupled to readout circuitry such as that described in the before mentioned commonly assigned U.S. patent application Ser. No. 07/387,209, the disclosure of which has been incorporated herein in its entirety.

Having thus reviewed the structure and operation of the FIRST detector embodiment of commonly assigned U.S. patent application Ser. No. 07/387,209 there is now described a five layer FIRST detector embodiment, as set forth in Ser. No. 07/557,898, filed July 25, 1991 and depicted in FIG. 3 herein.

A radiation detector 30 includes a bottom RF potential electrode 32, an overlying dielectric layer 34, a superconducting transmission line electrode 36, an overlying dielectric layer 38 and a top, radiation absorbing RF potential electrode 40. Radiation incident on the top surface of the detector 30 is absorbed within the first 200 Angstroms to 1,000 Angstroms of the top surface. The absorbed radiation breaks Cooper pairs causing an increase in the quasiparticle density. This increase in the quasiparticle density causes an increase in the magnetic penetration depth which results in a corresponding decrease in the resonant frequency of the resonant cavity structure defined by the electrodes 32, 36 and 40 in combination with the dielectric material. The material compositions, thicknesses and so on of the various layers of the detector 30 may be the same as that disclosed above for the corresponding layers of the FIRST detector 10 of FIG. 1.

It is noted that as used thus far a transmission line is considered to include at least two electrodes separated by a dielectric material wherein one of the electrodes conveys a radio frequency (RF) signal and has a resonant frequency associated therewith. The value of the resonant frequency is a function at least of the length of the electrode and the thickness and composition of the dielectrode material. Such an arrangement can be considered to form a resonant cavity structure. The electrode or electrodes that do not convey the RF signal and which define the walls of the resonant cavity are preferably maintained at RF ground potential. Typically these other electrodes will also be maintained at an earth ground potential but such is not a requirement. That is, these other electrodes may be maintained at some DC potential relative to earth ground. In the embodiment of FIG. 1 the radiation absorbing electrode 16 also conveys the RF signal and is comprised of superconductive material. For the embodiment of FIG. 3 at least the top radiation absorbing electrode 40 and the RF signal conveying electrode 36 are comprised of superconductive material.

Figure 4A:
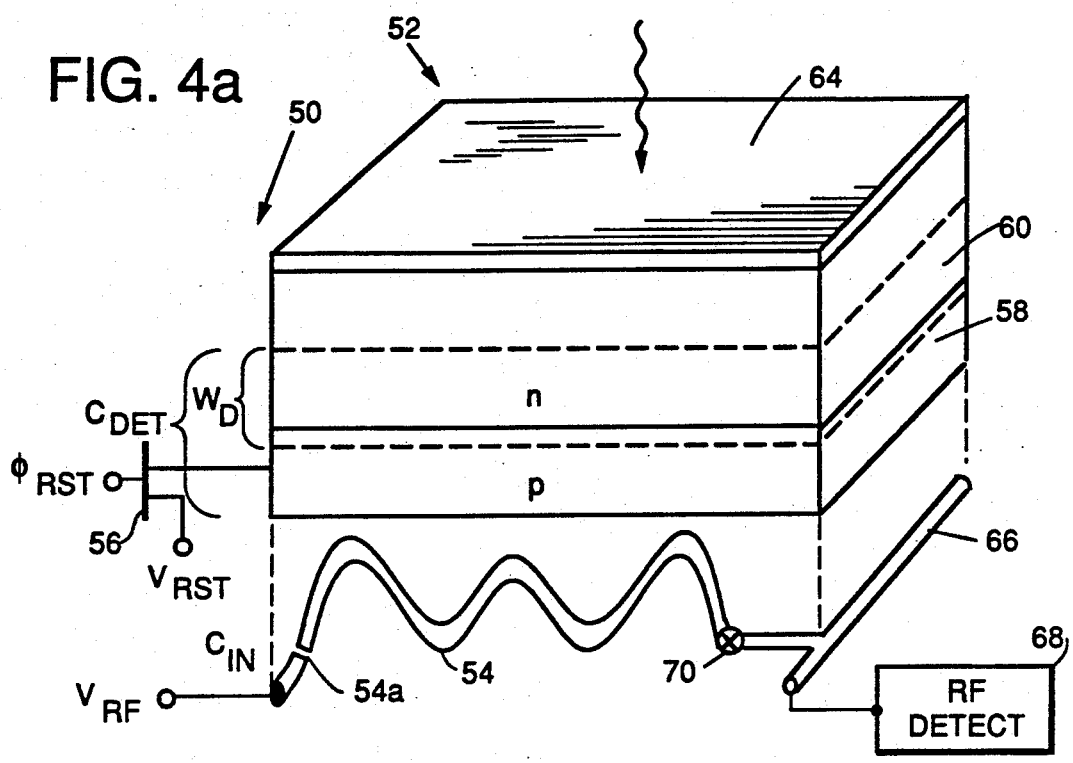
FIG. 4a is an elevational view, not to scale, showing a FIRST detector coupled to a photovoltaic radiation detector.

Referring now to FIG. 4a there is shown, in accordance with an embodiment of this invention, a Resonant Frequency Modulation (RFM) radiation detector 50 that includes a semiconductor photovoltaic (PV) detector 52, an inductive superconducting transmission line electrode 54 and a reset transistor 56 that is periodically energized by a signal $PHI_{RST}$ to couple a reset potential $V_{RST}$ to the PV detector 52. FIG. 4a is a partially exploded view wherein the vertical dashed lines indicate that the PV detector 52 is shown suspended above the transmission line electrode 54, it being realized that in practice the transmission line electrode 54 is closely adjacent and electrically coupled to the PV detector 52. A dielectric layer is preferably interposed between these two structures. The transmission line electrode 54 is disposed upon a layer of dielectric material which in turn is disposed upon an RF potential electrode. A gap 54a provided at the input to the electrode 54 has a capacitance ($C_{IN}$) associated therewith and provides AC coupling of the RF signal into the electrode 54. The gap 54a also provides a high impedance, non-loading input for the RF energy. A suitable width of the gap 54a is approximately the width of the transmission line electrode 54.

PV detector 52 is preferably a high performance semiconductor p-n junction heterojunction, superlattice or MIS diode detector fabricated with high mobility Group II-VI, Group III-V, Group IV—IV, InSb, HgCdTe or with combinations of these materials. The PV detector 52 includes a radiation transparent electrically conductive electrode 64, an n-type radiation absorbing layer 60 and a relatively thin p-type layer 58 that forms a p-n junction with the layer 60. By example, the p-type layer 58 has a thickness within a range of approximately 2000 Angstroms to several microns. When suitably biased a depletion region is formed across the p-n junction. In accordance with an aspect of the invention the PV detector 52 is coupled to the superconductive transmission line electrode 54 to form a RLC circuit having a resonant frequency that is modulated by an amount of radiation absorbed within the layer 60.

Figure 3:
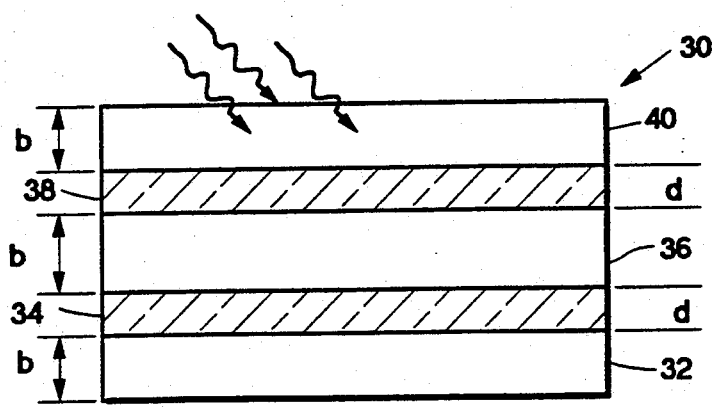
FIG. 3 is a cross-sectional view, not to scale, of an embodiment of the FIRST detector having a superconducting transmission line electrode interposed between a top and a bottom ground plane electrode and insulated therefrom by adjacent dielectric layers.

In this embodiment of the invention the high conductivity, optically detecting n-layer 60 is substituted for the superconductive RF potential electrode 40 of FIG. 3. An RF field, generated by the RF energy flowing in the superconducting transmission line electrode 54, penetrates through the relatively thin p-type layer 58 and terminates within the n-type layer 60. As such, and in a parallel resonant configuration described in detail below, a direct electrical connection between the transmission line electrode 54 and the PV device is not required, although in some embodiments direct connections may be employed. Electron and hole mobilities approaching 300,000 in n-type layers are achieved for lightly doped layers. Practical doping levels of 1E17 to 1E18 can be readily provided with impurity scattering limiting the mobility to approximately 50,000 $cm^2/V$-sec. Thus, resistivities of 100 microohm-cm are possible.

Similarly, doped HgTe/CdTe superlattices provide for electron and hole mobilities of 1E6 $cm^2/V$-sec. at effective concentrations of $1E18/cm^3$. Corresponding resistivities of 10 microohm-cm are comparable to that of highly conductive metals such as gold. Thus, a high Q resonant cavity is produced. The depletion depths ($W_D$) of such PV devices are believed to be relatively shallow but are still susceptible to being optically modulated. Superlattices also enable the use of relatively higher voltages before the onset of band-to-band tunneling.

As is also seen in FIG. 4a the cavity is coupled to an RF source ($V_{RF}$) at one end and to an output stripline 66 at the opposite end. A plurality of the detectors 50 can be attached to the stripline 66 via an optional RF switch 70. Stripline 66 is coupled to an RF detector 68, such as the RF power monitor previously described.

In other embodiments each transmission line has a different length for providing a different resonant frequency thereto, the RF source is a broadband source that encompasses the different resonant frequencies, and the detector 68 is comprised of a plurality of mixers or similar frequency selective circuits each responsive to a different one of the resonant frequencies. In such an embodiment a plurality of the radiation detector outputs can be applied simultaneously to the output stripline 66 and processed in parallel.

In the operation of the embodiment of FIG. 4a an increase in PV detector 52 capacitance ($C_{DET}$) occurs as photogenerated charge carriers discharge the initially reset device, thereby decreasing the width of the depletion region ($W_D$). This change in capacitance causes a change in the resonant frequency of the tank circuit which further causes a detectable change in the on-resonance RF energy transmitted through the superconducting transmission line 54.

Figure 4B:
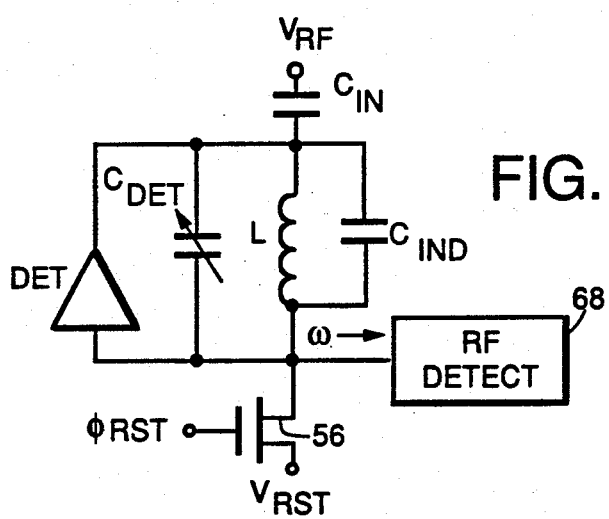
FIG. 4b is a schematic diagram illustrating a parallel resonant FIRST detector/photovoltaic radiation detector combination.
Figure 4C:
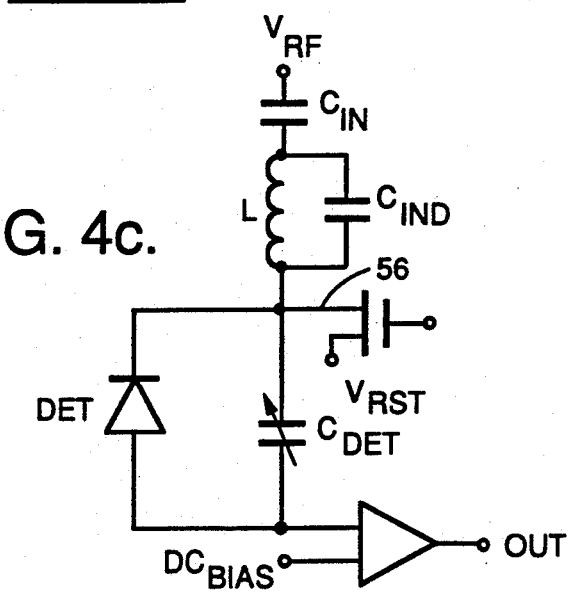
FIG. 4c is a schematic diagram illustrating resonant FIRST detector/photovoltaic radiation detector combination.
Figure 4D:
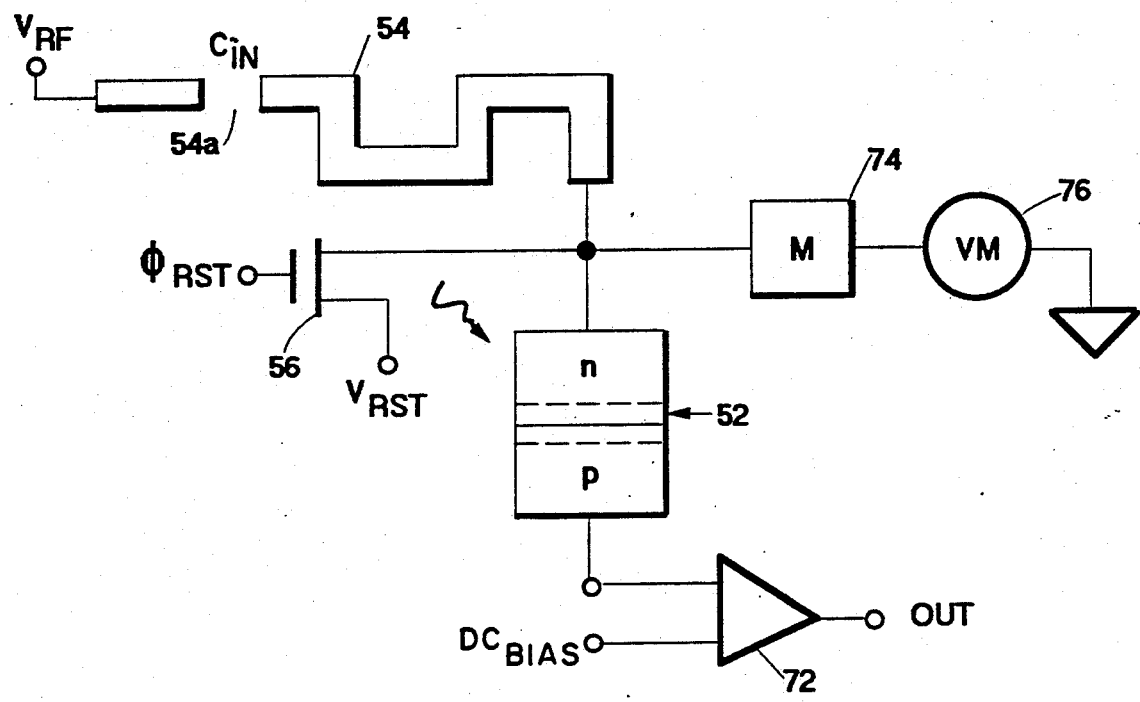
FIG. 4d illustrates in block diagram form the series resonant configuration of FIG. 4c.

FIG. 4b is a schematic representation of the parallel resonant configuration of FIG. 4a. FIG. 4c is a schematic representation of a series resonant configuration and FIG. 4d is a block diagram illustrating the series resonant configuration. $C_{IND}$ is a parasitic parallel capacitance associated with the transmission line electrode 54 while L is the transmission line electrode 54 inductance. The PV detector capacitance ($C_{DET}$) is shown as a variable capacitor to account for the change in effective capacitance upon illumination. A typical value for L is several micro-Henries, $C_{DET}$ is approximately one to approximately three pico-Farads and $C_{IND}$ has a comparable or smaller capacitance value. For the parallel configuration of FIG. 4b a dip in the output occurs at resonance while for the series configuration of FIG. 4c the output of the amplifier 72 peaks at resonance. The magnitude of $DC_{BIAS}$ is a function of the substrate bias potential.

Figure 5B:
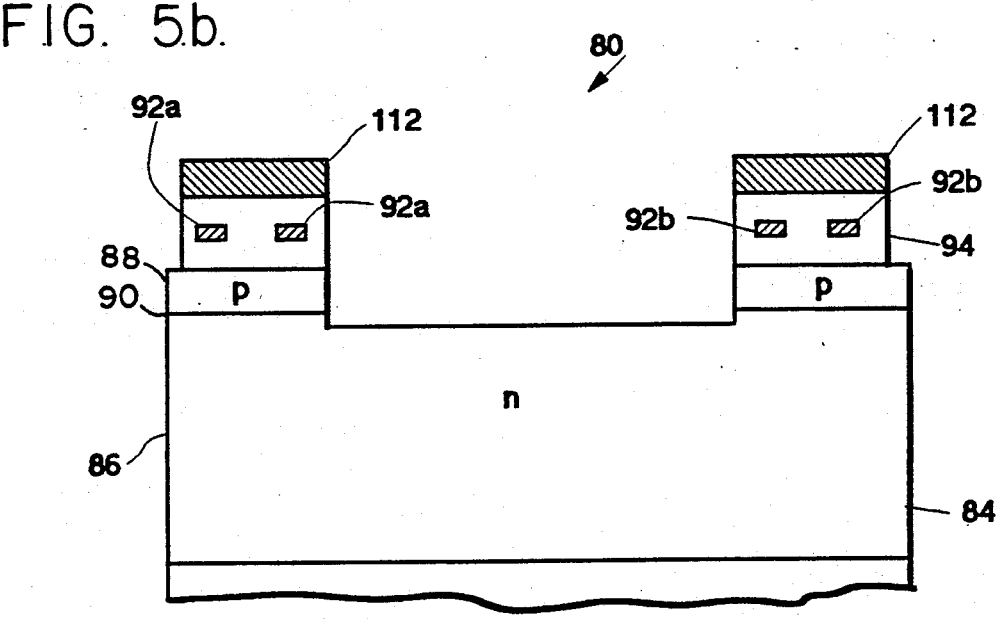
Figure 5A:
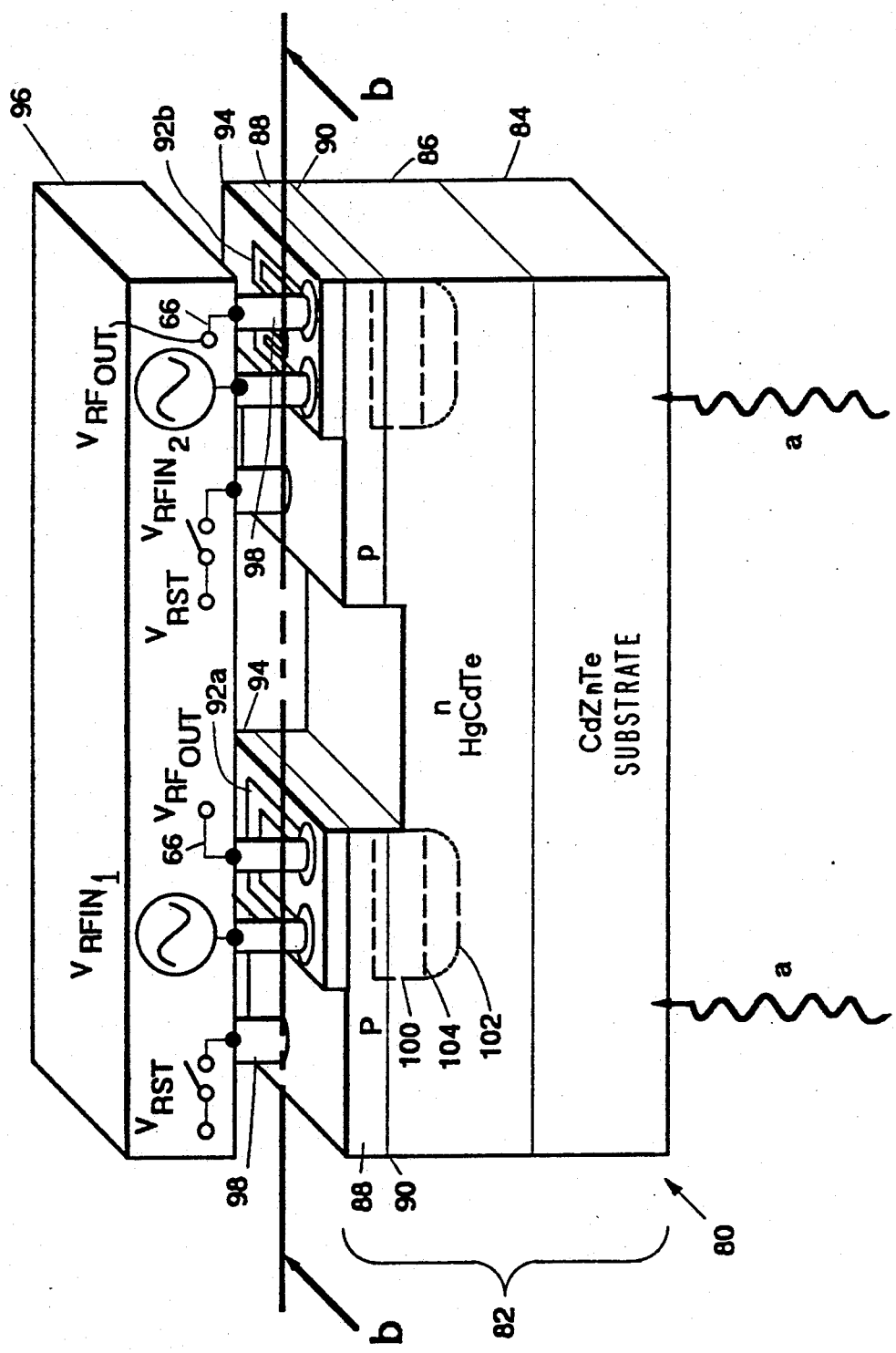
FIG. 5a is an elevation view, not to scale and partly in schematic form, showing a plurality of FIRST detectors each coupled to a photovoltaic radiation detector and bumped with an overlying readout chip.

In the parallel configuration of FIGS. 4a and 4b the transmission line electrode 54 is preferably electrically coupled, as described, by a penetration of the RF field energy into the high mobility n-type layer 60. The thickness of the dielectric material that is interposed between the p-type layer 58 and the electrode 54 is sufficiently thin so that the p-type layer 58 and the n-type layer 60 form one wall of the resonant cavity structure. The opposite wall is formed by a superconductive RF ground plane electrode 112, as depicted in FIGS. 5a and 5b, that is also spaced apart from the electrode 54 by dielectric material. The resulting cavity structure is substantially electrically equivalent to that depicted in FIG. 3 for the five layer FIRST detector embodiment.

For the series resonant configuration the meander line electrode 54 may still be physically disposed beneath the p-type layer 58, as in FIG. 4a, but the intervening dielectric material is formed to have a greater thickness for substantially eliminating RF coupling between the transmission line electrode 54 and the n-type layer 60. By example, the dielectric has a thickness that is approximately ten times as great as the corresponding dielectric thickness for the parallel resonant embodiment. Also, the electrode 54 is electrically coupled at one point to the PV device 52, as depicted in FIG. 4d.

In this series resonant embodiment the output can be taken by a virtual current measurement amplifier, such as the Transimpedance Amplifier (TIA) 72, or by a voltage measuring device such as a Voltmeter (VM) 76. For this latter embodiment a Mixer (M) 74 may be employed to provide a readily measurable RF envelope to the VM 76.

It is important to note in both the parallel resonant embodiment of FIGS. 4a and 4b and in the series resonant embodiment of FIGS. 4c and 4d that a detectable change in the RF energy is accomplished by an optical flux modulation of the circuit capacitance, specifically a flux-induced modulation of the depletion region width. In contradistinction the embodiments of FIGS. 1, 2 and 3 operate in accordance with a flux-induced modulation of the transmission line electrode inductance, through the agency of Cooper pair breaking, as described in detail above.

For the embodiments of FIGS. 4a–4d a change in output resonant frequency (delta omega) is equal to $$\Delta\omega = \Delta l/\sqrt{LC} \qquad (7)$$

or $$\Delta\omega = -\omega\Delta c/2c. \qquad (8)$$

Referring now to FIGS. 5a and 5b there is shown a further embodiment of the invention, specifically a radiation detector 80 that includes a PV semiconductor radiation detector 82. In the illustrated embodiment radiation detector 82 is a backside illuminated mesa-type device having a transparent CdZnTe substrate 84, an overlying n-type HgCdTe radiation absorbing layer 86 and an overlying p-type HgCdTe layer 88. The layer 88 and a portion of the layer 86 are physically differentiated into a plurality of p-n junctions 90 for forming a plurality of PV detectors. It should be realized that other material compositions, such as GaAs, and other types of detectors, such as a superlattice, can also be employed.

In accordance with the invention each of the PV detectors has coupled thereto a superconducting transmission line electrode 92. In the illustrated embodiment a first transmission electrode 92a has a length that is less than a length of a transmission line electrode 92b such that each of the transmission line electrodes has a different characteristic resonant frequency. Transmission line electrodes 92 are disposed upon a surface of a relatively thin dielectric layer 94 which is comprised of one of the aforementioned dielectric materials, such as Lanthanum Aluminate. Overlying the structure described thus far is a readout device or chip 96 that is comprised of silicon or GaAs. Readout chip 96 is coupled to the underlying PV/transmission line electrode device by conventional indium bump technology. The individual indium bumps are shown as the structures 98. As can be seen, each photodetector requires three indium bumps including one for applying the reset signal ($V_{RST}$), one for applying the input RF signal and a third for coupling the RF signal out of the transmission line electrode 92 and to the stripline 66. For the illustrated embodiment the electrodes 92a and 92b are provided with different RF signals $V_{RFIN1}$ and $V_{RFIN2}$, respectively. In other embodiments the electrodes 92 are fed from a common broadband RF signal. For this embodiment the parallel resonant configuration of FIGS. 4a and 4b is illustrated. To achieve parallel resonant operation the thickness of the dielectric layer 94 is sufficiently thin to permit RF coupling between the electrodes 92 and the underlying high mobility n-type material. If the transmission line electrodes are coupled to the underlying semiconductor material by a direct electrical connection the required conductive via or vias are preferably comprised of superconductive material.

In operation the application of $V_{RST}$ causes the depletion region 100 of each PV detector to be reset to a maximum width as indicated by the dashed line 102. As radiation (indicated by the arrows A) is absorbed within the layer 86 charge carriers are produced causing a reduction in the width of the depletion region 100 to a dimension indicated by 104. This reduction in the width of the depletion region causes a corresponding increase in the effective capacitance of the p-n junction 90 and a decrease in the resonant frequency of the tank circuit comprised of the inductance of the overlying transmission line electrode 52 and the p-n junction 90 capacitance. As before, this reduces the resonant frequency of the tank circuit and causes a detectable change in the on-resonance RF energy transmitted through the superconducting transmission line electrode 92. The amount of change or the rate of change in the RF signal is a function of the magnitude of the radiation flux density.

In FIG. 5a the upper portion of the dielectric and the upper RF potential electrode are removed to more clearly illustrate the meander line electrodes 92. The cross-sectional view of FIG. 5b shows in greater detail that the electrodes 92 are interposed between an upper RF potential superconductive electrode 112 and the p-type layer 88 and adjacent n-type layer 86 of the PV radiation detector 82. The resonant cavity structure is thus defined by these structures.

Figure 6A:
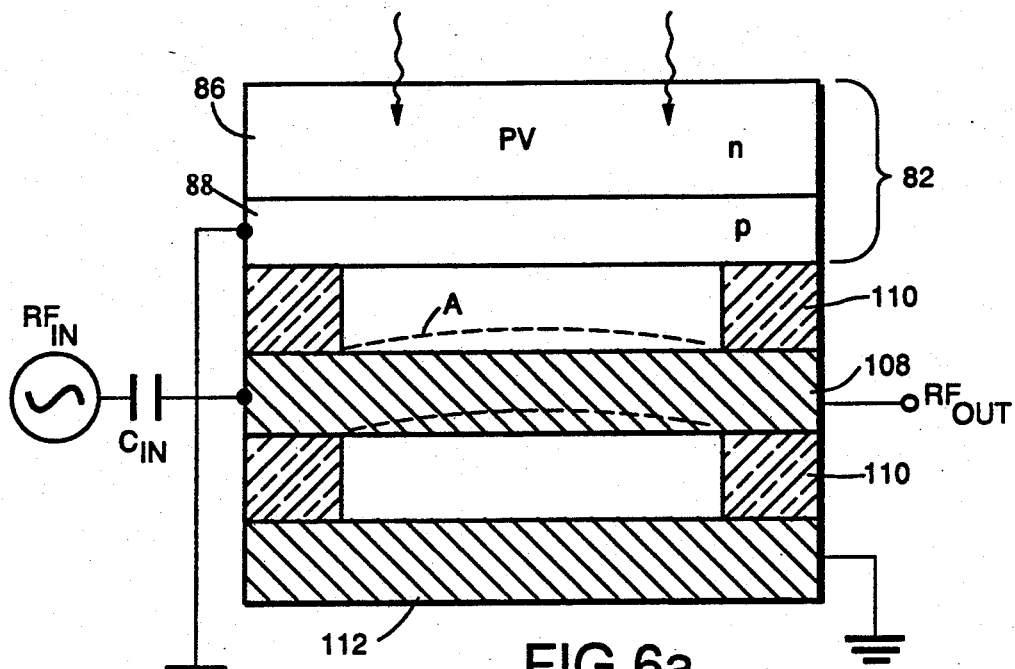
FIG. 6a is a cross-sectional view, not to scale, showing a further embodiment of the invention wherein a transmission line electrode is suspended relative to and interposed between an RF ground electrode and a PV detector.

Referring now to FIG. 6a there is shown in cross-section a further embodiment of the invention that includes a backside illuminated PV semiconductor device 82 having a superconducting resonant transmission line electrode 108 that is supported at its ends such that it is capable of flexing along its length. Spacers 110 support and separate the electrode 108 from the surface of the p-type layer 88. Overlying the transmission line electrode 108 and spaced apart therefrom by additional spacers 110 is a RF ground potential electrode 112. The space or gap formed between the transmission line electrode 92 and the p-type layer 88 and the electrode 112 may be a vacuum or may be filled with a gas or liquid. The width of each gap is preferably within a range of approximately 500 Angstroms to approximately 10,000 Angstroms. The area occupied by the detector is approximately that of one image pixel or, for example, a 100 micron by 100 micron region. A reset transistor 56 is provided for periodically resetting through a load $Z_L$ the PV radiation detector 82. In other embodiments the reset transistor 56 is capacitively coupled to the transmission line electrode 92 for resetting the transmission line electrode 92 to a reference potential, such as a DC potential of 100 volts. An on-resonance RF signal is coupled into the transmission line electrode 92 through an input capacitance $C_{IN}$.

In operation, the p-layer 88 is reset to the reference potential through the reset transistor 56. Subsequently, and upon illumination of the PV detector 82, the DC potential impressed upon the p-layer 88 is discharged due to the generation of charge carriers by absorbed radiation.

In accordance with this embodiment of the invention when the p-type layer 88 is first reset to the reference potential an electrostatic attractive force causes a flexure of the transmission line electrode 108 between the supported points, as indicated by the dashed line labeled (A). This flexure establishes an initial displacement and, hence, an initial value for the distributed capacitance between the transmission line electrode 108 and the p-type layer 88 and the overlying electrode 112. As a result an initial resonant frequency of the resonant cavity defined by these elements is established. As the PV detector 82 absorbs radiation and the initial electrostatic potential is discharged there is a corresponding change in the amount of flexure and an increase in the displacement between the transmission line electrode 108 and the p-type layer 88. This results in a change in the resonant cavity distributed capacitance value with a corresponding change in the resonant frequency of the cavity in accordance with Equation (1). The end result is a detectable change in the RF signal output of the transmission line electrode 108, the amount of change being indicative of the magnitude of the radiation flux absorbed by the PV detector 82.

For this embodiment the width of the gaps between the p-type layer 88 and the electrode 108 and also between electrode 108 and the electrode 112 are each selected to avoid a condition where an increase in the distributed capacitance on one side of the electrode 108 is exactly offset by a decrease in distributed capacitance on the opposite side. If this condition where to exist a negligible change in the cavity resonant frequency may result for a given range of flexures of the electrode 108.

Deflections within the range of approximately 10 Angstroms to several thousands of Angstroms are achievable depending upon the magnitude of the electrostatic potential, the width of the gap, the distance between and number of electrode support points and the thickness of the flexing electrode. By example, for a pixel cell size that is 100 microns on a side and for an edge supported electrode having a thickness of several hundred Angstroms a maximum flexure, or displacement from an initial, uncharged position, can be expected to be on the order of approximately 200 Angstroms to electrostatic force causes a displacement of the electrode 108 on the order of 100 Angstroms/Volt with a corresponding frequency change on the order of a factor of approximately 10% or more per Volt. The electrode 112 is preferably fabricated with a low temperature or a high temperature superconducting material although a high conductivity non-superconducting material, such as a gold film, may also be employed.

The device of FIG. 6a may be fabricated by providing the PV detector 82. The spacer 110 material that is adjacent to the p-type layer 88 is then selectively deposited or deposited and then selectively removed to form a desired shape, such as a ring. The spacer material may comprise, by example, $Y_2O_3$. Within the ring of $Y_2O_3$ is deposited the material that will subsequently be removed by a preferential etch. Suitable materials are $BaF_2$ and $CaF_2$. The superconducting electrode 108 is next formed over the ring and filler material and the filler material is subsequently removed to leave the gap between the electrode 108 and the p-type layer 88. This process is repeated to form the upper gap and the electrode 112. The formation of one or more discontinuities or openings in the ring wall facilitates the performance of the preferential wet chemical etch.

Figure 6B:
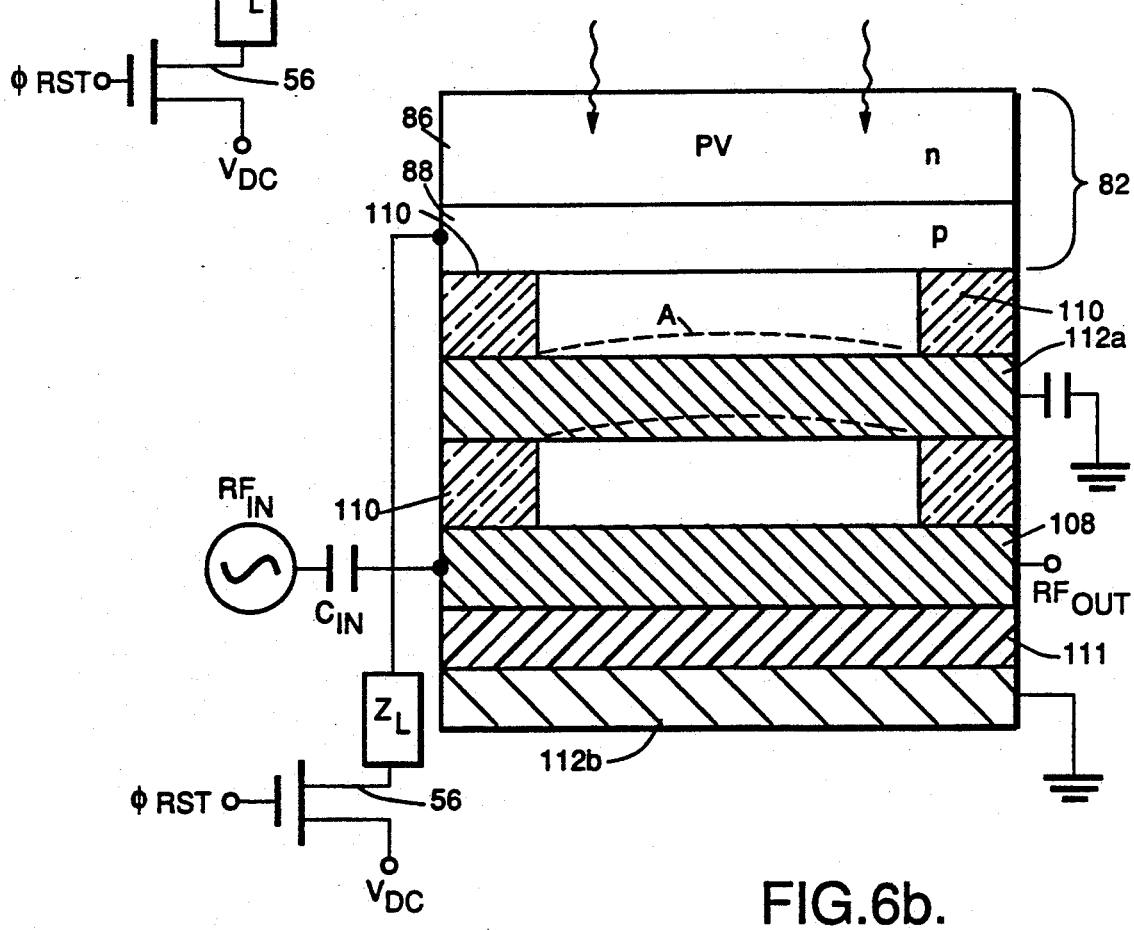
FIG. 6b is a cross-sectional view, not to scale, showing a further embodiment of the invention wherein an RF ground plane electrode is suspended relative to and interposed between a transmission line electrode a PV detector.

FIG. 6b is a cross-sectional view, not to scale, showing a further embodiment of the invention wherein an RF ground plane electrode 112a is suspended by spacers 110 and is interposed between the transmission line electrode 108 and the PV detector 82. This embodiment resembles more closely the five layer FIRST detector embodiment of FIG. 3 in that the transmission line electrode 108 is disposed upon a dielectric layer 111 which in turn is disposed over a second superconducting RF ground lane electrode 112b. For this embodiment the RF ground electrode 112a experiences a flexure which varies the distributed cavity capacitance, resulting in a change in the cavity resonant frequency and a detectable change in the RF signal propagating through the transmission line electrode 108. The electrode 112a is preferably capacitively coupled to circuit ground in order to provide the RF ground potential while permitting the establishment of the electrostatic potential between the electrode 112a and p-type layer 88. This embodiment is presently preferred over the embodiment of FIG. 6a at least for the reason that it is relatively less complex to fabricate.

For either of the embodiments of FIGS. 6a or 6b the PV detector 82, or an array of same, may also be mechanically hybridized with the superconducting electrode and spacer structures as illustrated.

While the invention has been particularly shown and described with respect to various embodiments thereof, it will be understood by those skilled in the art that changes in form and details may be made therein without departing from the scope and spirit of the invention.

What is claimed is:

1. A radiation detector including a resonant cavity means comprised of transmission line means and having an input port for coupling to a frequency signal and an output port for coupling to sensor means for detecting a variation in the frequency signal, said resonant cavity means further comprising photovoltaic radiation detector means electrically coupled to said transmission line means, said resonant cavity means being responsive to electromagnetic radiation that is absorbed within said photovoltaic radiation detector means for having induced therein a detectable change in a resonant frequency of said resonant cavity means.

2. A detector as set forth in claim 1 wherein said transmission line means is comprised of an electrode comprised of a layer of superconducting material.

3. A detector as set forth in claim 1 wherein said resonant cavity means further comprises an electrode spaced apart from said transmission line means by a gap for enabling a flexure between said transmission line means and said second electrode.

4. A detector as set forth in claim 3 and further comprising means for impressing an electrostatic potential difference between said photovoltaic radiation detector means and either said transmission line means or said electrode for inducing the flexure thereof.

5. A detector as set forth in claim 2 wherein said electrode has a substantially linear shape that is folded within a region, the region being disposed upon the photovoltaic radiation detector means.

6. A detector as set forth in claim 5 wherein said electrode has a width of approximately 0.1 micron to approximately 1000 microns.

7. A detector as set forth in claim 1 wherein the resonant frequency of said resonant cavity means is a function at least of a length of said transmission line means and is within a range of approximately several hundred KHz to approximately to approximately 1000 GHz.

8. A detector as set forth in claim 2 wherein said electrode is comprised of a high current density polycrystalline or a nominally single crystalline film layer.

9. A detector as set forth in claim 2 wherein said electrode is comprised of material selected from the group consisting essentially of Pb, Nb, NbN, superconducting compounds having an A-15 crystal structure, Nb$_3$(M) where M is Sn, Al or Ge, or compounds based on compositions containing (Y, Ba, Cu, O), (Bi, Sr, Ca, Cu, O), (Tl, Ba, Ca, Cu, O) and elemental replacements or substitutions thereof.

10. A detector as set forth in claim 1 and further comprising a dielectric material interposed between said transmission line means and said photovoltaic radiation detector means and wherein said dielectric material is comprised of a material selected from the group consisting essentially of an amorphous polycrystalline insulator, a crystalline insulator, and a thinned single crystal superconductor substrate material.

11. A detector as set forth in claim 2 and further comprising a dielectric material interposed between said electrode and said photovoltaic radiation detector means and wherein said dielectric material is comprised of a material selected from the group consisting essentially of silicon dioxide, silicon nitride, aluminum, magnesium, zirconium, rare-earth or niobium oxides, epitaxially grown layers comprised of compounds related to adjacent superconducting material, oxides of Mg, Al, strontium titanate, lanthanum gallate, lanthanum aluminate or combinations thereof.

12. A detector as set forth in claim 1 wherein said photovoltaic radiation detector means is comprised of a device selected from the group consisting essentially of a semiconductor p-n junction heterojunction, a superlattice or a MIS diode fabricated with material selected from the group consisting of Group II-VI material, Group III-V material, Group IV—IV material, or combinations thereof.

13. A detector as set forth in claim 1 and further comprising readout means coupled to said transmission line means and to said photovoltaic detector means though a plurality of connectors.

14. A detector as set forth in claim 1 wherein said transmission line means is electrically coupled to said photovoltaic detector means for forming a parallel resonant circuit.

15. A detector as set forth in claim 1 wherein said transmission line means is electrically coupled to said photovoltaic detector means for forming a series resonant circuit.

16. A frequency domain radiation detector having a resonant cavity comprising transmission line means and having an input port for coupling to a frequency signal and an output port for coupling to sensor means for detecting a variation in the frequency signal, said transmission line means being interposed between first electrode means and a photovoltaic radiation detector means that are disposed for forming opposed walls of said resonant cavity, said resonant cavity including at least one gap disposed along at least one surface of said transmission line means, the gap having a width which is modulated as a function of an amount of electromagnetic radiation that is absorbed within the photovoltaic radiation detector means for causing a detectable change in a resonant frequency of the resonant cavity.

17. A detector as set forth in claim 16 wherein the width is approximately 500 Angstroms to approximately 10,000 Angstroms.

18. A detector as set forth in claim 16 wherein said transmission line means is comprised of a second electrode means that is supported in a parallel arrangement with a surface of the photovoltaic radiation detector means and further comprising means for impressing an electrostatic force across the gap for inducing a flexure of the second electrode means.

19. A detector as set forth in claim 16 and further including second electrode means supported in a spaced apart arrangement with a surface of the photovoltaic radiation detector means for defining a second gap therebetween, the second electrode means being interposed between the surface of the photovoltaic radiation detector means and said transmission line means, the detector further comprising means for impressing an electrostatic force across the second gap for inducing a flexure of the second electrode means.

20. A detector as set forth in claim 16 wherein said transmission line means is comprised of material selected from the group consisting essentially of Pb, Nb, NbN, superconducting compounds having an A-15 crystal structure, Nb$_3$(M) where M is Sn, Al or Ge, or compounds based on compositions containing (Y, Ba, Cu, O), (Bi, Sr, Ca, Cu, O), (Tl, Ba, Ca, Cu, O) and elemental replacements or substitutions thereof.

21. A frequency domain radiation detector including a resonant cavity comprised of a transmission line means having an input port for coupling to a frequency signal and an output port for coupling to sensor means for detecting a variation in the frequency signal, said resonant cavity further comprising photovoltaic radiation detector means electrically coupled to said transmission line means such that an inductive reactance associated with said transmission line means forms a series resonant or a parallel resonant circuit in combination with a capacitive reactance associated with a depletion region of said photovoltaic radiation detector means, said resonant cavity being responsive to electromagnetic radiation that is absorbed within said photovoltaic radiation detector means for inducing a change in a resonant frequency of said resonant cavity.

22. A detector as set forth in claim 21 wherein said transmission line means is comprised of material selected from the group consisting essentially of Pb, Nb, NbN, superconducting compounds having an A-15 crystal structure, Nb$_3$(M) where M is Sn, Al or Ge, or compounds based on compositions containing (Y, Ba, Cu, O), (Bi, Sr, Ca, Cu, O), (Tl, Ba, Ca, Cu, O) and elemental replacements or substitutions thereof.

23. A detector as set forth in claim 21 and further comprising a dielectric material interposed between said transmission line means and said photovoltaic radiation detector means and wherein said dielectric material is comprised of a material selected from the group consisting essentially of an amorphous polycrystalline insulator, a crystalline insulator, and a thinned single crystal superconductor substrate material.

24. A detector as set forth in claim 21 and further comprising a dielectric material interposed between said electrode and said photovoltaic radiation detector means and wherein said dielectric material is comprised of a material selected from the group consisting essentially of silicon dioxide, silicon nitride, aluminum, magnesium, zirconium, rare-earth or niobium oxides, epitaxially grown layers comprised of compounds related to adjacent superconducting material, oxides of Mg, Al, strontium titanate, lanthanum gallate, lanthanum aluminate or combinations thereof.

25. A detector as set forth in claim 21 wherein said photovoltaic radiation detector means is comprised of a device selected from the group consisting essentially of a semiconductor p-n junction heterojunction, a superlattice or a MIS diode fabricated with material selected from the group consisting of Group II-VI material, Group III-V material, Group IV—IV material, or combinations thereof.

26. A detector as set forth in claim 21 and further comprising RF ground potential electrode means for forming a wall of said resonant cavity, and wherein said transmission line means and said RF ground potential electrode means are each comprised of material selected from the group consisting essentially of Pb, Nb, NbN, superconducting compounds having an A-15 crystal structure, Nb$_3$(M) where M is Sn, Al or Ge, or compounds based on compositions containing (Y, Ba, Cu, O), (Bi, Sr, Ca, Cu, O), (Tl, Ba, Ca, Cu, O) and elemental replacements or substitutions thereof.

* * * * *